Dec. 1, 1959    J. SZYDLOWSKI    2,915,238
AXIAL FLOW COMPRESSORS
Filed Oct. 18, 1954    2 Sheets-Sheet 1
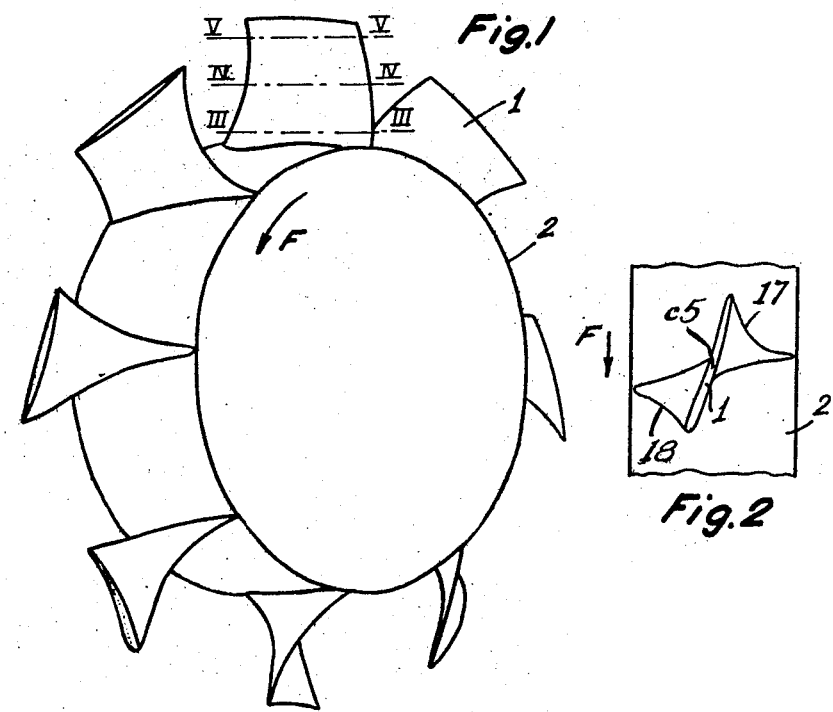
Fig.1
Fig.2
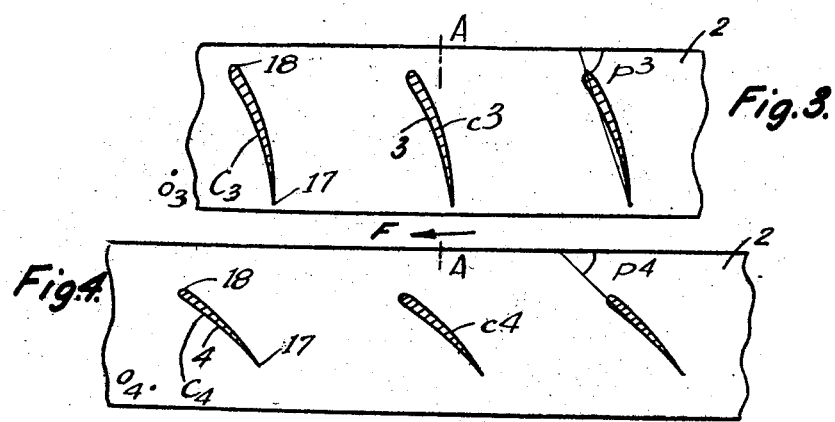
Fig.3.
Fig.4.

United States Patent Office 2,915,238
Patented Dec. 1, 1959

2,915,238

AXIAL FLOW COMPRESSORS

Joseph Szydlowski, Societe Turbomeca, Bordes, France

Application October 18, 1954, Serial No. 462,882

Claims priority, application France October 23, 1953

8 Claims. (Cl. 230—134)

The present invention relates to improvements in the rotors of axial-flow compressors, and more particularly of such compressors which operate at ultrasonic and supersonic speeds.

Since the bulk and weight are critical factors in flying machines, the compressors of aircraft turbine engines have been consequently designed to operate at higher and higher speeds. However, conventional compressors with blade camber-lines curved in the same direction throughout the blade length cannot operate with acceptable efficiencies when the Mach number of the air flow speed is high.

For remedying such a drawback, according to the invention, the camber-line of the axial-flow compressor rotor blades is curved in opposite directions at the tip and at the root end thereof. Such a construction of the blades permits substantially higher efficiency than heretofore obtained with conventional rotor wheels when operating at ultrasonic and supersonic flow speeds.

A further object of the invention is to provide jet engines, gas turbine engines and other similar machines, more particularly aviation machines, with compressors having rotor wheels of the type specified above.

Conveniently, an axial-flow wheel such as specified above is used as the single wheel of a compressor or as the first stage wheel of a multi-stage compressor, or as the single or first stage wheel of the low-pressure compressor of a jet engine, a double-flow jet engine or other similar machines having more than one compressor.

Thus, by way of examples, the compressor wheel of the invention is more particularly used with advantage in double flow jet engines and in jet engines of the type described in the following U.S. patent applications in the name of applicant, Ser. No. 170,817, filed June 28, 1950, now abandoned, Ser. No. 386,761, filed October 19, 1953 and Ser. No. 432,561, filed May 26, 1954, now Patent No. 2,795,372, or in the following French patents in the name of applicant: No. 971,350, patented July 12, 1950, No. 907,666 patented July 9, 1945, No. 908,121 patented August 23, 1945, No. 915,552, patented July 22, 1946, and No. 1,046,175, patented July 8, 1953.

The invention will be better understood and other features thereof will appear by means of the following description of a practical embodiment of the invention, reference being made to the accompanying drawings, in which:

Fig. 1 is a perspective view of an axial-flow compressor wheel constructed according to the invention;

Fig. 2 is a radial view of a blade;

Fig. 3 is a partial developed view of a cylindrical section of the wheel adjacent the blade roots along the line III—III shown in Fig. 1.

Fig. 4 is a partial developed view of a cylindrical section of the wheel mid-way between the blade roots and tips along the line IV—IV shown in Fig. 1.

Figure 5:
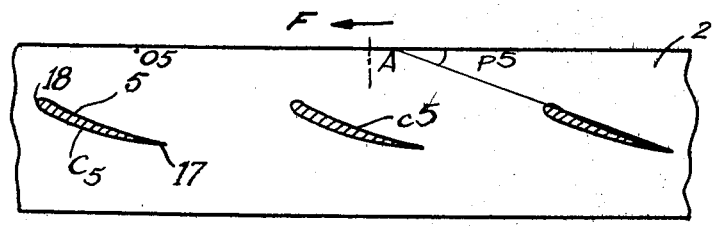
Fig. 5 is a partial developed view of a cylindrical section of the wheel adjacent the blade tips along the line V—V shown in Fig. 1.

Referring to Fig. 1, a compressor wheel 2 is provided with a plurality of blades 1. The centers $c3$, $c4$ and $c5$ of the cross-sections 3, 4 and 5 of each blade (Figs. 3 to 5) through planes parallel to the plane tangent to the rotor at the blade root and passing through the lines III—III, IV—IV and V—V of Fig. 1 are substantially aligned from the blade foot to the blade tip along the radius passing through the center $c3$ of the blade foot.

Each blade 1 has a trailing edge 17 and a leading edge 18 which curve in opposite directions, the trailing edge 17 having a spanwise curvature from the radial inner end of the blade to its radial outer end in a counter rotating direction with respect to the direction of rotation F of the wheel while the leading edge has a spanwise curvature in said direction of rotation. Such curvatures are so determined that the blade is flared at the radial inner and radial outer ends with an intermediate narrow portion.

As illustrated in Figs. 3 to 5, the chordal pitches $p3$, $p4$, $p5$ of the cross-sections 3, 4 and 5 numerically decreases from a positive value $p3$ from the foot to a positive value $p5$ at the tip of the blade. The chord 17—18 of the cross-section 3 at the blade foot is slightly inclined to the axis of rotation A of the wheel 2 in the direction F of the wheel rotation. The chords of the successive cross-sections from the blade foot to the blade tip are more and more inclined to said axis so that the chord 17—18 of the cross-section 5 at the blade tip forms substantially a right angle with said axis A.

Besides, said cross-sections have a concave-convex shape, the concave curves such as $C_3$ and $C_4$ being on the pressure side of the blade from the blade foot approximately to half the height of said blade while the convex curves such as $C_5$ are on the pressure side for the remainder of the blade towards the tip thereof. The centers of curvatures $O_3$ and $O_4$ of the concave curves $C_3$ and $C_4$ are located with respect to the blade sections in the direction F of the wheel rotation while the center of curvature $O_5$ of the convex curve $C_5$ is directed in the direction opposite to said direction F. The radius of curvature for the concave curve $C_4$ is greater than that of the concave curve $C_3$. There will be a point in the blade length where the cross-section will be symmetrical with respect to the chord line.

Figure 6:
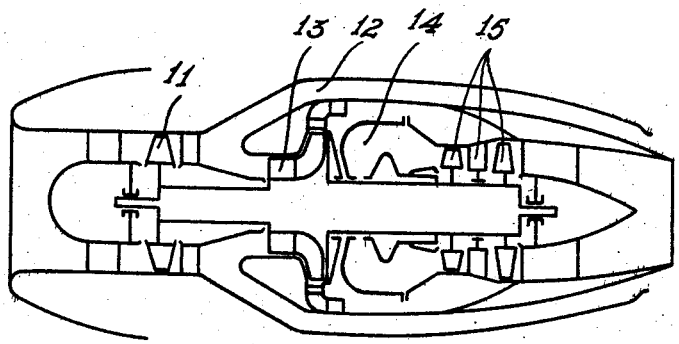
Fig. 6 is a diagrammatical longitudinal section of a double-flow jet engine provided with a compressor wheel according to the invention.

Referring now to Fig. 6, the illustrated double-flow jet engine comprises a single-stage low-pressure or boosting compressor 1 the single rotor wheel of which is constructed as described above with reference to Figs. 1 to 5, said low-pressure compressor delivering compressed air, in the well-known manner, to the by-pass duct 12 and to the high-pressure compressor 13 delivering air to the combustion chamber 14 the exhaust gases of which drive the turbine 15.

Of course, modifications may be made to the described embodiments without departing from the spirit and scope of the invention. Thus, for example the mid-length section of the blade could have already a curvature in the direction opposite to that of the root section.

What I claim is:

1. A wheel for axial compressors operating at ultrasonic and supersonic speeds, comprising, in combination, a body, said body being adapted for rotation about an axis, and a plurality of blades supported at their bases by said body, the centers of the cross-sections of each blade through planes parallel to the plane tangent to the body at the blade base being substantially aligned from the blade foot to the blade tip along the radius passing through the center of the blade base, the chordal pitch of said cross-sections numerically decreasing from a positive value from the foot to a positive value at the tip of the blade, said cross-sections having a concave curve on the pressure side from the blade foot approximately to half the height of said blade and a convex curve on the pressure side for the remainder of said blade.

2. A wheel as claimed in claim 1, wherein each blade has a leading and trailing edge and wherein the trailing edge of each blade has a spanwise curvature from the radial inner end to the radial outer end of the blade in a counter rotating direction with respect to the rotary direction of the wheel while its leading edge has a spanwise curvature in said rotary direction, said curvatures defining flared radial inner and outer ends for the blade with an intermediate narrow portion.

3. A wheel as claimed in claim 1, wherein all the cross-sections of each blade have a concave-convex shape.

4. A wheel for axial compressors operating at ultrasonic and supersonic speeds, comprising, in combination, a body, said body being adapted for rotation about an axis, and a plurality of blades supported at their bases by said body so as to have leading and trailing edges, the trailing edge of each blade having a spanwise curvature from the radial inner end to the radial outer end of the blade in a counter rotating direction with respect to the rotary direction of the wheel while its leading edge has a spanwise curvature in said rotary direction, said curvatures defining flared radial inner and outer ends for the blade with an intermediate narrow portion, the centers of the cross-sections of each blade through planes parallel to the plane tangent to the rotor at the blade base being substantially aligned from the blade base to the blade tip along the radius passing through the center of the blade foot, the chordal pitch of said cross-sections numerically decreasing from a positive value from the foot to a positive value at the tip of the blade while said cross-sections have a concave curve on the pressure side from the blade foot approximately to half the height of said blade and a convex curve on the pressure side for the remainder of said blade.

5. An axial compressor having at least one stage with at least one wheel and intended for operation at ultrasonic and supersonic speeds, at least one of the wheels of at least one stage of the compressor having blades supported by their feet thereupon, the centers of the cross-sections of each blade through planes parallel to the plane tangent to the wheel at the blade foot being substantially aligned from the blade foot to the blade tip along the radius passing through the center of the blade foot, the chordal pitch of said cross-sections numerically decreasing from a positive value from the foot to a positive value at the tip of the blade while said cross-sections have a concave curve on the pressure side from the blade foot approximately to half the height of said blade and a convex curve on the pressure side for the remainder of said blade.

6. A compressor, comprising, in combination, at least one stage operating at ultrasonic and supersonic speeds, said compressor forming the inlet compressor of a jet engine, said compressor having at least one wheel in at least one stage of said compressor, said wheel having a plurality of blades including feet and tips, the centers of the cross-sections of each blade through planes parallel to the plane tangent to the wheel at the blade foot being substantially aligned from the blade foot to the blade tip along the radius passing through the center of the blade foot, the chordal pitch of said cross-sections numerically decreasing from a positive value from the foot to a positive value at the tip of the blade while said cross-sections have a concave curve on the pressure side from the blade foot approximately to half the height of said blade and a convex curve on the pressure side for the remainder of said blade.

7. A compressor comprising at least one stage with at least one wheel operating at ultrasonic and supersonic speeds and acting as a low pressure compressor for a double flow jet engine, at least one of said wheels of at least one stage of said compressor having blades including feet and tips, the centers of the cross-sections of each blade through planes parallel to the plane tangent to the wheel at the blade foot being substantially aligned from the blade foot to the blade tip along the radius passing through the center of the blade foot, the chordal pitch of said cross-sections numerically decreasing from a positive value from the foot to a positive value at the tip of the blade while said cross-sections have a concave curve on the pressure side from the blade foot approximately to half the height of said blade and a convex curve on the pressure side for the remainder of said blade.

8. A compressor having at least one stage operating at ultrasonic and supersonic speeds and forming the inlet compressor of a gas turbine, said compressor comprising at least one wheel forming at least one stage of said compressor and having blades including feet and tips, the centers of the cross-sections of each blade through planes parallel to the plane tangent to the rotor at the blade foot being substantially aligned from the blade foot to the blade tip along the radius passing through the center of the blade foot, the chordal pitch of said cross-sections numerically decreasing from a positive value from the foot to a positive value at the tip of the blade while said cross-sections have a concave curve on the pressure side from the blade foot approximately to half the height of said blade and a convex curve on the pressure side for the remainder of said blade.

References Cited in the file of this patent

UNITED STATES PATENTS

| | | |
|---|---|---|
| 2,269,287 | Roberts | Jan. 6, 1942 |
| 2,430,140 | Phelan et al. | Nov. 4, 1947 |
| 2,570,155 | Redding | Oct. 2, 1951 |

FOREIGN PATENTS

| | | |
|---|---|---|
| 26,979 | Great Britain | of 1903 |
| 33,489 | Switzerland | Feb. 26, 1905 |
| 376,647 | Great Britain | July 14, 1932 |